United States Patent
Bolster et al.

(10) Patent No.: US 12,295,385 B2
(45) Date of Patent: May 13, 2025

(54) PLANT-BASED PROTEIN MIXTURES AND NUTRITIONAL COMPOSITIONS

(71) Applicant: WHITEWAVE SERVICES INC., Broomfield, CO (US)

(72) Inventors: Douglas Bolster, Longmont, CO (US); Jessica Brennan, Golden, CO (US); Maneephan Keerati-U-Rai, Broomfield, CO (US); Huaixia Yin, Broomfield, CO (US)

(73) Assignee: WHITEWAVE SERVICES INC., Broomfield, CO (US)

( * ) Notice: Subject to any disclaimer, the term of this patent is extended or adjusted under 35 U.S.C. 154(b) by 582 days.

(21) Appl. No.: 17/617,194

(22) PCT Filed: Jun. 5, 2020

(86) PCT No.: PCT/US2020/036328
§ 371 (c)(1),
(2) Date: Dec. 7, 2021

(87) PCT Pub. No.: WO2020/247753
PCT Pub. Date: Dec. 10, 2020

(65) Prior Publication Data
US 2022/0232851 A1 Jul. 28, 2022

(51) Int. Cl.
*A23J 1/14* (2006.01)
*A23J 3/14* (2006.01)

(52) U.S. Cl.
CPC .. *A23J 1/14* (2013.01); *A23J 3/14* (2013.01)

(58) Field of Classification Search
None
See application file for complete search history.

(56) References Cited

U.S. PATENT DOCUMENTS

| 2008/0206430 A1 | 8/2008 | Avila |
| 2008/0226810 A1 | 9/2008 | Passe et al. |
| 2015/0250851 A1 | 9/2015 | Hofman et al. |

FOREIGN PATENT DOCUMENTS

| CN | 101061860 A | 10/2007 |
| CN | 102458159 A | 5/2012 |
| CN | 102665736 A | 9/2012 |
| CN | 108271917 A | 7/2018 |
| RU | 2524241 C2 | 7/2014 |
| UA | 28236 A | 10/2000 |
| WO | 2012084624 A1 | 6/2012 |
| WO | 2013148688 A1 | 10/2013 |

OTHER PUBLICATIONS

Product ID 5709179—Vega Sport Plant-Based Recovery Supplement With Apple Berry Flavor, May 2019 (Innova new products database).
Product ID 2076955—Nutra Life Whole Plus Organic Protein Shake Mix With Natural Chocolate Flavor, Apr. 2015 (Innova new products database).
Product ID 1451869—Pulsin Pea Protein Premium Quality Vegan Protein Powder, Jan. 2013 (Innova new products database).
Product ID 5197714—Momentous Absolute Zero Essential Pure Protein Perfection Dietary Supplement With Vanilla Chai Flavor, Oct. 2018 (Innova new products database).
Product ID 5197748—Momentous Absolute Zero Essential Pure Protein Perfection Dietary Supplement With Piedmont Chocolate Flavor, Oct. 2018 (Innova new products database).
Product ID 4312650—Sunfood Superfoods Raw Organic Rice And Pea Protein Powder, May 2017 (Innova new products database).
First Third Party Observation dated Aug. 9, 2023 in European Patent Application No. 20818420.0 (EP Publication No. EP3979809), 3 pages.
Second Third Party Observation dated Aug. 9, 2023 in European Patent Application No. 20818420.0 (EP Publication No. EP3979809), 2 pages.
I.V. Shulvinskaya et al., Composite Protein Additives From Oilseed and Melon Plants Seeds, News of Universities, Food Technology, N 5-6, 2007 p. 40-42.
Minevich I.E. et al., "Characteristics of protein concentrate and polysaccharide extract powders obtained from flax raw materials by spray drying," Research of the Properties of Substances and Products of the Agricultural Complex, HIPS N 3, 2020, pp. 46-54.
Russian Search Report issued in Russian Application No. 20211138399 on Sep. 6, 2023.
De Francesco et al., "Effect of long-term feeding with a plant protein mixture based diet on growth and body/fillet quality traits of large rainbow trout (*Oncorhynchus mykiss*)," Aquaculture, Jun. 1, 2004, vol. 236, No. 1-4, pp. 413-429.
Extended European Search Report in 20818420.0, mailed May 30, 2023, 9 pages.

*Primary Examiner* — Jyoti Chawla
(74) *Attorney, Agent, or Firm* — ArentFox Schiff LLP

(57) ABSTRACT

The present invention relates to plant-based protein mixture and nutritional compositions and supplements comprising said mixtures.

12 Claims, 3 Drawing Sheets

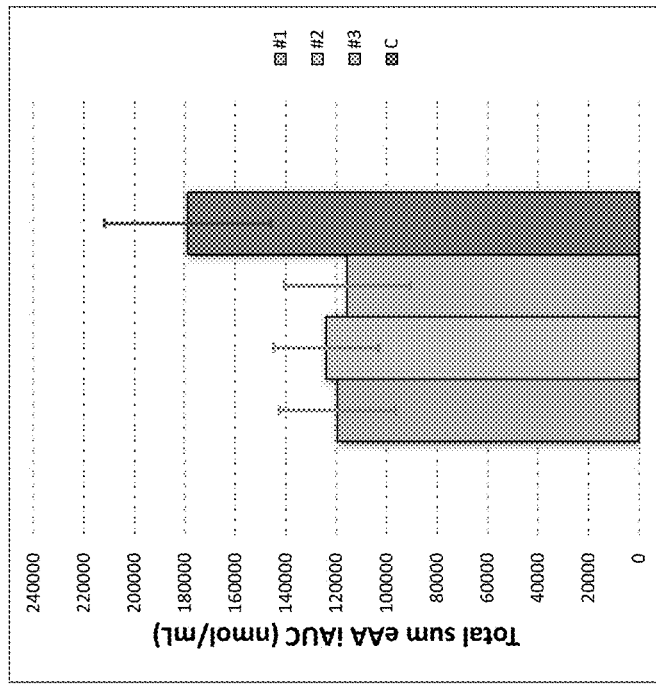
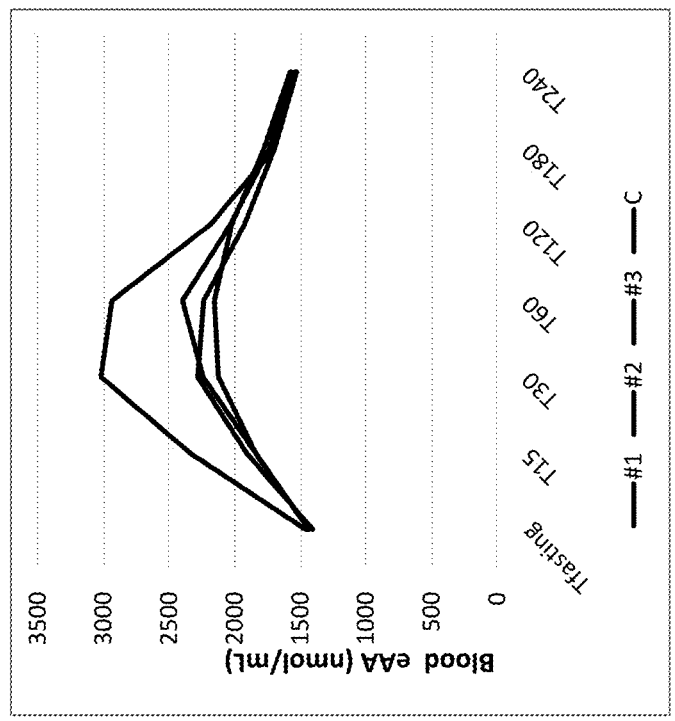
Figure 1
Figure 1A
Figure 1B

PLANT-BASED PROTEIN MIXTURES AND NUTRITIONAL COMPOSITIONS

CROSS-REFERENCE TO RELATED APPLICATIONS

This application is a National Stage Entry of PCT/US2020/036328, filed Jun. 5, 2020, which claims priority to U.S. provisional application No. 62/858,458, filed Jun. 7, 2019, the disclosures of each of which are hereby incorporated by reference in their entireties.

FIELD OF THE INVENTION

The present invention relates to plant-based protein mixtures, nutritional compositions and supplements comprising said mixtures, and methods of using the same.

TECHNICAL BACKGROUND

There is increased interest in plant-based diets among mainstream consumers who consider themselves vegan, vegetarian or lactose-intolerant, and among recreationally active individuals and trained athletes.

In the diet, consumption of a blend of plant-based proteins is a common strategy to compensate for the fact that individual plant protein sources are typically deficient in one or more essential amino acids (eAAs). Additionally, leucine has been shown to be the most potent eAA responsible for postprandial stimulation of muscle protein synthesis (MPS).

Protein quality is typically calculated as the Protein Digestibility Corrected Amino Acid Score (PDCAAS), and refers to how well dietary protein can match the demand for amino acids, and can predict the level of utilization of the protein (FAO Rome, 2013). PDCAAS is a function of the essential amino acid profile and digestibility of the protein.

Digestibility of protein impacts the rate at which amino acids appear in the blood. Factors that may impact protein digestibility relate to the food matrix and include high levels of insoluble fiber and high concentrations of antinutritional factors, present endogenously or formed during food manufacturing. As such, dairy proteins, which are generally devoid of these factors, typically provide a more rapid and larger amount of free amino acids to the blood compared to plant protein.

The magnitude or hyperaminoacidemia following ingestion of protein are important determinants for stimulating muscle protein synthesis (MPS), a key biological function of dietary protein. The essential amino acid composition of a protein relates to its ability to stimulate MPS; where those proteins having all essential amino acids in adequate quantities, would have the optimal ability to stimulate MPS. The branch-chained amino acids (BCAAs) isoleucine, valine and leucine, are a unique class of essential amino acids due to the role they play in supporting. In fact, there is data to suggest that leucine content alone, is a direct indicator of protein quality as it relates to MPS.

Protein supplementation is a common practice amongst athletes who typically have consumed animal-based proteins such as whey protein isolate (WPI) as a "gold standard" based on its high digestibility and favorable amino acid profile. However, individuals who prefer to avoid animal-based products are interested in protein alternatives with similar anabolic attributes. Typically, only single source plant-proteins have been evaluated.

Animal and human studies have demonstrated that when leucine level is matched, animal-based protein and plant-based proteins have similar MPS effects. However, plant-based protein sources typically have less leucine (~6-8%) than animal-based protein (>10%). Therefore, to match the leucine content of dairy, plant-based proteins must be consumed in high dosages (~50-60 g).

Studies have found similarities in absorption of high doses of single-source proteins and animal-based proteins, however, little is known about how a plant-based protein blend, optimized to match the digestibility and quality of animal protein, may compare. Additionally, single-source protein hydrolysates have been found to have superior and similar digestion and absorption to non-hydrolysate plant-based protein and animal-based proteins, respectively. However, the digestibility and absorption of a hydrolysis of a plant-based blend optimized to meet the digestibility of animal protein has not been studied.

Blended plant-based protein supplements are commercially available (e.g., Vega Sport® Protein), and are typically a combination of plant-based proteins, largely pea protein. Little information is to be found regarding the bioavailability and EAA or leucine blood plasma effects of such products.

Thus, there is a need for formulation of a plant-based protein blend with a high PDCAAS and similar leucine bioavailability to WPI as a "complete" protein option, which may be advantageous to e.g., an athlete, vegans, vegetarians etc. Formulation of such a plant-based protein blend would be advantageous for the plant-based (vegan, vegetarian or flexitarian) athlete.

SUMMARY OF THE INVENTION

The present invention follows from the unexpected finding that plant-based protein mixtures described herein provide rapid increase in blood plasma leucine, which is a critical response associated with postprandial stimulation MPS.

DETAILED DESCRIPTION OF THE INVENTION

As used herein the term "plant-based" shall be taken to mean a composition or product which does not comprise animal or animal-derived (e.g., mammal milk) matter.

As used herein the adjective "dairy" shall be taken to mean a composition or product comprises or consists of mammalian milk matter, i.e., the lacteal secretion obtainable by milking.

As used herein the terms "-free" "free of" or "free from" shall be taken to mean a composition or product which preferably does not contain a given substance but where trace amounts or contaminants thereof may be present.

As used herein the term "EAAs" or "essential amino acids" shall be taken to mean Histidine, Isoleucine, Leucine, Lysine, Methionine, Phenylalanine, Tryptophan, Threonine and Valine.

As used herein the term "BCAAs" or "branched chain amino acids" shall be taken to mean Isoleucine, Leucine and Valine.

As used herein the term "bioequivalent" shall refer to amino acid plasma concentration equivalence.

In the context of the present application, when referring to a "protein mixture", a "protein fraction", or a "protein composition" according to the invention, is meant a collection of proteins, proteinaceous matter, peptides and amino acids, free or in any bound form. Hence, the protein fraction of a nutritional composition is the sum of all proteins, proteinaceous matter, peptides and amino acids, free or in any bound form present in the nutritional composition. Furthermore, the wording "protein mixture" refers to a collection of proteins, proteinaceous matter, peptides and amino acids as such, in any form, as well as to a collection of proteins, proteinaceous matter, peptides and amino acids simultaneously present in another matrix, such as an aqueous matrix, such as a nutritional composition. In the latter case, the protein mixture may be referred to as a protein fraction of that matrix.

In the context of this application, the plant-based protein mixture preferably consists essentially of intact plant proteinaceous matter, in particular proteins.

In the context of this application, the wording "plant" relates to protein from plant origin, such as, for instance originating from plant s such as carrot, pea, chickpea, green pea, cowpea, field pea, kidney bean, lupine, rice, soy, canola, hemp, zein, maize, corn, barley, flax, linseed, and wheat. Equivalent wording may be used, such as "vegetal", "plant-based" or "plant-derived".

In the context of this application, the term "at least" also includes the starting point of the open range. For example, an amount of "at least 95.00% w/w" means any amount equal to 95.00 percentage by weight or above.

In the context of this application, the term "about" defines a range of plus or minus 10% of the cited value. For example, an amount of "about 20 weight %" means any amount within the range of 18 to 22 weight %.

As used herein the term "protein supplementation" shall be taken to mean increasing the amount of protein consumed by an individual as part of their diet by means of a dietary supplement.

As used herein the term "dietary supplement" shall be taken to mean a product that is intended to be ingested in addition to the normal diet of a subject for nutritional purposes.

As used herein the term "protein supplement" shall be taken to mean a dietary supplement for protein supplementation.

Surprisingly, it was found that plant protein mixtures of the present invention having a high PDCAAS and leucine content could be quickly absorbed into the blood providing rapid hyperleucinemia, which has been associated with the anabolic potential of a protein source. Hence, according to one embodiment, the protein mixture according to the invention may be used in the manufacture of a nutritional composition for dietary protein supplementation. According to one aspect, the protein mixture comprises 50.0%-95.0% w/w pulse protein relative to total protein content, and 5.0%-50.0% w/w non-pea plant protein relative to total protein content, and 60.0%-25.0% w/w essential amino acids relative to total protein content, wherein the sum of said proteins equals 100 weight %.

In the context of this application, a "non-hydrolyzed" protein is equivalent to an "intact" protein, meaning that the protein has not been subjected to a hydrolysis process. However, minor amounts of hydrolyzed proteins may be present in the source of non-hydrolyzed proteins, or may be added during product formulation. According to another embodiment, intact protein may only possess a degree of hydrolysis (DH) of 5% or lower, preferably 3, 2, 1% or lower, more preferably 2% or lower.

Protein Mixtures

In a first aspect, the present invention provides a plant-based protein mixture that has a high relative concentration of pulse protein, a non-pea protein, and wherein the mixture has a high content of essential amino acids relative to total protein content. For example, in one aspect, the plant-based protein comprises:

a) 50.0%-95.0% w/w pulse protein relative to total protein content;
b) 5.0%-50.0% w/w non-pea plant protein relative to total protein content;

and 60.0%-25.0% w/w essential amino acids relative to total protein content, wherein the sum of said proteins equals 100 weight %. In another aspect, the plant-based protein comprises 50.0%-25.0% w/w essential amino acids relative to total protein content.

The protein mixture of the invention may comprise more than 25.0% protein by weight dry matter weight in the mixture and up to 95.0% protein by weight dry matter weight in the mixture. According to various embodiments of the invention, the protein mixture comprises least 50.0%, preferably at least 60.0%, more preferably at least 70.0%, further preferably at least 80.0%, protein by weight dry matter weight in the mixture. According to other embodiments of the invention, the protein mixture comprises about 50.0% to about 70.0% protein by weight dry matter weight in the mixture. In other embodiments, the protein mixture may comprise other components, such as fibers.

Pulse Plant Protein

Particularly preferred are pulses selected from the group consisting of lentils, chickpeas, peas, beans, and combinations thereof. Most preferred are pulses selected from the group consisting of split peas, field peas, dry peas, lentil, chickpeas, garbanzo bean, konda, navy bean, white navy bean, white pea bean, pea bean, cow pea, horse bean, haricot, pinot bean, mottled bean, small red bean, red Mexican bean, kidney bean, black bean, black turtle bean, cranberry bean, roman bean, speckled sugar bean, lima bean, haba bean, Madagascar bean, green gram, mung bean, green bean, black gram, urad dal, lupin, and combinations thereof. Most preferred are pea protein. Several pea sources are readily available to the skilled person, for example, from Roquette (Lestrem, France) which markets a pea isolate obtained from the yellow pea (*Pisum sativum*), and from Cosucra Groupe Warcoing (Warcoing, Belgium). Other pea protein sources include green pea, cowpea, chickpea, and field pea.

According to another embodiment, the plant-based protein mixture according to the invention comprises 50.0%-95.0% w/w pulse protein, in particular 60.0% to 90.0% w/w, preferably 70.0% to 95.0% w/w, more preferably 80.0% to 90.0% w/w of pulse protein, relative to the total protein in the protein mixture. It is most preferred that said protein is pea protein. According to other embodiments of the invention, the pulse protein is preferably substantially in intact form, as defined herein.

Non-Pea Plant Protein

The plant-based protein mixture according to the invention further comprises a second non-pea plant protein. Preferably, the non-pea protein is selected from a group consisting of pumpkin, coconut, sunflower, chickpea, rice, and combinations thereof.

More preferably, the non-pea protein is selected from a group consisting of pumpkin, coconut, sunflower, and combinations thereof. Most preferably, the non-pea protein comprises pumpkin protein. According to embodiments of the invention, the non-pea protein is preferably substantially in intact form, as defined herein.

According to another embodiment, the plant-based protein mixture according to the invention comprises 5.0%-50.0% w/w non-pea protein, in particular 40.0% to 10.0% w/w, preferably 30.0% to 5.0%, more preferably 20.0% to 10.0% w/w of non-pea protein, relative to the total protein in the protein mixture. It is most preferred that said protein comprises pumpkin protein. According to other embodiments of the invention, the non-pea protein is preferably substantially in intact form, as defined herein.

Preferred Mixtures

According to embodiments of the invention, the plant-based protein mixture according to the invention comprises 50.0%-95.0% w/w pulse protein, most preferably pea protein and 5.0%-50.0% w/w non-pea plant protein based on total protein content and 60.0%-25.0% w/w (or 50.0%-25.0% w/w) essential amino acids relative to total protein content, wherein the sum of said proteins equals 100 weight %.

According to embodiments of the invention, the plant-based protein mixture according to the invention comprises 70.0%-95.0% w/w pulse protein, most preferably pea protein and 5.0%-30.0% w/w non-pea plant protein based on total protein content and 60.0%-25.0% w/w (or 50.0%-25.0% w/w) essential amino acids based on total protein content, wherein the sum of said proteins equals 100 weight %.

According to embodiments of the invention, the plant-based protein mixture according to the invention comprises 80.0%-90.0% w/w pulse protein, most preferably pea protein and 10.0%-20.0% w/w non-pea plant protein based on total protein content and 60.0%-25.0% w/w (or 50.0%-25.0% w/w) essential amino acids based on total protein content, wherein the sum of said proteins equals 100 weight %.

The aforementioned plant-based protein mixtures have a rapid amino acid blood absorption profile, having a Tmax comparable to whey protein isolate and is thus of significant anabolic potential.

Amino Acid Profile

The plant-based protein mixture according to the invention may comprise 60.0%-25.0% w/w, preferably 60.0%-40.0% w/w essential amino acids based on total protein content wherein the sum of said proteins equals 100 weight %. In other embodiments, the plant-based protein mixture according to the invention may comprise 50.0%-25.0% w/w, preferably 50.0%-40.0% w/w essential amino acids based on total protein content wherein the sum of said proteins equals 100 weight %. According to alternative embodiments of the invention, essential amino acid ("EAA") profile in miligrams per gram of solids in the plant-based protein mixtures is provided in Table 1.

According to other embodiments of the invention, the plant-based protein mixture according to the invention comprises 10.0%-25.0%, preferably 15.0%-20.0% w/w branched chain amino acids based on total protein content, wherein the sum of said proteins equals 100 weight %.

According to other embodiments of the invention, the plant-based protein mixture according to the invention comprises 5.0%-15.0% w/w, preferably 7.0%-12.0% w/w leucine based on total protein content, wherein the sum of said proteins equals 100 weight %.

TABLE 1

| Amino acid | mg/g |
|---|---|
| Histidine | 10-30 |
| Isoleucine | 30-50 |
| Leucine | 50-150 |
| Lysine | 40-70 |
| Methionine | 10-30 |

TABLE 1-continued

| Phenylalanine | 80-100 |
|---|---|
| Threonine | 20-40 |
| Tryptophan | 1-30 |
| Valine | 30-50 |

Characterization of the Protein Mixture

The protein mixture according to the invention and its quality is characterized by determining the Protein Digestibility Corrected Amino Acid Score (PDCAAS) using the essential amino acid content of the different individual protein sources, their digestibility and the Joint FAO/WHO Expert Consultation on Protein Quality Evaluation (1991) amino acid recommendations as reference. According to embodiments of the invention, the PDCAAS value of the protein mixture is at least 0.95, more preferably at least 0.96, 0.97, 0.98, 0.99 or 1.

According to embodiments of the invention, the protein mixture according to the invention is characterized by determining the time to peak maximum blood plasma leucine concentration ("Tmax") from ingestion of the mixture. According to embodiments of the invention, the Tmax of the protein mixture is between 30 and 120 minutes, 30 and 90 minutes, 30 and 60 minutes or about equivalent to whey protein isolate.

The plant-based protein mixture according to the invention makes it possible to increase the protein content of plant-based food or beverage products. Accordingly, the present invention provides a method of supplementing the nutritional value of a food or beverage, the method comprising admixing a protein mixture according to the invention to said food or beverage.

Preferably, the mixture does not substantially change the organoleptic properties of the food or beverage, said organoleptic properties are one or more selected from the group consisting of taste, texture, color, and combinations thereof.

Dietary Supplement Compositions

Surprisingly, the plant-based protein mixture according to the invention makes it possible to produce a nutritional composition, in particular, a dietary supplement composition with a long shelf life, more particularly, a protein supplement composition. Hence, the invention also pertains to a plant-based protein mixture for use in the manufacture of a nutritional composition, in particular, a dietary supplement composition, in particular for use as a protein supplement composition.

Preferably, the nutritional composition according to the invention comprises the protein mixture according to the invention, said protein mixture comprises at least 70.0%, preferably at least 80.0%, more preferably at least 90.0%, further preferably at least 95.0%, of the total protein of the composition by weight.

Preferably, the nutritional composition according to the invention comprises the protein mixture according to the invention, said protein mixture comprises at least 50.0%, at least 60.0%, preferably at least 70.0%, more preferably at least 80.0%, further preferably at least 85.0%, of the composition solids by weight.

The nutritional composition according to the invention may have any physical form, such as a powder, spray-dried, granulated or liquid form, and it may be a solution, suspension, dispersion or the like. Preferably, the nutritional composition according to the invention is in powder form. Alternatively, the nutritional composition mixture is an aqueous protein mixture.

Most preferably, such nutritional composition is sterilized or otherwise heat-treated.

The nutritional composition according to the invention preferably has the form of a protein supplement composition, whereby a single serving or dose can meet a significant percentage of the user daily recommended protein intake. As such, the nutritional composition according to the invention preferably contains at least 15, 20, 25, 30, 35, 40, 45, 50 or 55 grams of protein per serving.

Preferably, the nutritional composition is an orally ingestable dietary supplement composition, and it can, for example, be used in addition to a non-medical food or normal diet. Preferably, the recommended serving size or dose of the nutritional composition is up to about 25, 30, 35, 40, 45, 50, 55, 60 or 70 grams by weight of solids in the compositions which may be provided in a single or multiple units.

Preferably, the nutritional composition is packaged, stored and provided in a container such as plastic tub, bag, pouch or the like. A variety of such containers, for example, 500 ml, 1000 ml, 1500 ml and 5,000 ml containers are known in the art. It should be noted that any suitable container can be used to package, store and provide the nutritional composition according to the invention.

In one embodiment of the present invention, the composition is provided in a ready-to-use powdered form and that may be reconstituted or mixed in a liquid (such as aqueous solution or water) prior to use. The composition according to the invention can be ingested or administered orally. For example, the composition according to the invention can be provided in a can, glass, bottle or other drinking vessel. Thus, in one embodiment of the present invention, the present composition is in the form of a powder, accompanied with instructions to dissolve or reconstitute in an aqueous composition or water to arrive at the liquid nutritional composition according to the present invention. In one embodiment of the present invention, the present liquid nutritional enteral composition may thus be obtained by dissolving or reconstituting a powder, preferably in an aqueous composition, in particular water.

In one embodiment of the present invention, the composition according to the invention is packaged. The packaging may have any suitable form, for example for liquid compositions a block-shaped carton, e.g., to be emptied with a straw; a can or plastic beaker with removable cover; a bottle for example for the 80 ml to 200 ml range, Another suitable packaging mode is a powder in a container, e.g., a sachet or tub with removable lid optionally with instructions to dissolve or reconstitute in an aqueous composition or water.

Preferably, the protein mixtures, food, beverage and nutritional compositions according to the present invention are substantially free of cereal, gluten, soy, dairy and combinations thereof.

Dietary Protein Supplementation

In a second aspect, the present invention provides uses and methods for protein supplementation of an individual comprising administering to the individual a nutritional composition of the invention. Protein supplementation according to the compositions and methods of the present invention may provide anabolic muscle benefits. Said uses or methods are preferably non-therapeutic.

Accordingly, the present invention provides protein mixtures, compositions and methods of the present invention for use in enhancing muscle protein synthesis, recovery from physical exercise and/or post exercise muscle recovery. The present invention further provides protein mixtures, compositions and methods for use in decreased fat mass, increased lean body mass, increased skeletal muscle hypertrophy, increased power output, and increased strength. Alternatively, the present invention further provides protein mixtures, compositions and methods for use in increasing dietary protein intake, preferably to the level of recommended daily intake of protein.

In further embodiments, the present invention provides methods for enhancing muscle protein synthesis, recovery from physical exercise and/or post exercise muscle recovery by administering protein mixtures, by administering protein mixtures, compositions and methods of the present invention. In further embodiments, the present invention provides methods for decreased fat mass, increased lean body mass, increased skeletal muscle hypertrophy, increased power output, and/or increased strength by administering protein mixtures, compositions and methods of the present invention. Alternatively, the present invention provides methods for increasing dietary protein intake, preferably to the level of recommended daily intake of protein by administering protein mixtures, compositions and methods of the present invention.

Preferably, said nutritional composition is ingested shortly prior to, during and/or subsequent to physical exercise. Accordingly, the present invention provides a method for improving a result of physical exercise in a subject, the method comprising ingesting or administering to the subject a nutritional composition of the invention during and/or within about 15, 30 or 45 minutes prior or subsequent to physical exercise.

Dosage

Preferably the nutritional composition is provided in a dose or serving size that contains at least 15, 20, 25, 30, 35, 40, 45, 50 or 55 grams of protein optionally at least once or twice daily.

Preferably the nutritional composition is provided in a dose or serving size that contains 20.0, to 50.0 grams of protein, more preferably 20.0 to 40.0 grams of protein, most preferably 30-40 grams of protein, said serving is preferably provided once daily, or alternatively twice or more times daily.

Preferably, the nutritional composition is provided in a dose or serving size that contains 1.0, to 20.0 grams of essential amino acids, more preferably 10.0, to 15.0 grams of essential amino acids, said serving is preferably provided once daily, or alternatively twice or more times daily.

Preferably the nutritional composition is provided in a dose or serving size that contains 1.0, to 10.0 grams of branched chain amino acids, more preferably 4.0, to 6.0 grams of branched chain amino acids, said serving is preferably provided once daily, or alternatively twice or more times daily.

Preferably, the nutritional composition is provided in a dose or serving size that contains 1.0, to 5.0 grams of leucine, more preferably 2.0, to 3.5 grams of leucine, said serving is preferably provided once daily, or alternatively twice or more times daily.

According to embodiments of the invention, the nutritional composition according to the invention is provided in a dose or serving size of up to 50 grams comprising 20.0 to 40.0 grams of total protein, said total protein comprising 10.0, to 15.0 grams of essential amino acids, 2.0, to 7.0 grams of branched chain amino acids and 2.0, to 3.5 grams of leucine.

According to embodiments of the invention, the nutritional composition according to the invention is provided in a dose or serving size having essential amino acid bioequivalence about equal to that of a specified quantity of whey protein isolate, wherein the essential amino acid content by weight of said dose or serving is greater than that of the specified quantity of whey protein isolate by a factor of up to 1.5.

According to embodiments of the invention, the nutritional composition according to the invention is provided in a dose or serving size having branched chain amino acid bioequivalence about equal to that of a specified quantity of whey protein isolate, wherein the branched chain amino acid content by weight of said dose or serving is greater than that of said specified quantity of whey protein isolate by a factor of up to 1.5.

According to embodiments of the invention, the nutritional composition according to the invention is provided in a dose or serving size having leucine bioequivalence about equal to that of a specified quantity of whey protein, wherein the leucine content by weight of said dose or serving is greater than that of said specified quantity of whey protein isolate by a factor of up to 1.5, preferably 1.2 to 1.5, e.g., 1.4.

As an illustrative example, the nutritional composition according to the invention may be provided in a dose or serving size having EAA and leucine bioequivalence to a whey protein isolate having 12 g EAA and 2.63 g leucine, wherein said dose or serving size comprises 48 grams of total protein, said total protein comprising 17 grams of essential amino acids of which 3.7 grams of leucine.

Intact Proteins

Surprisingly, it was observed that the intact protein groups indicated an unexpected trend of a higher amino acid blood concentration level than a hydrolyzed test group. Accordingly, it is preferred that the proteins are in all proteins are in substantially intact or non-hydrolyzed form. In one embodiment, the plant-based protein mixture according to the invention comprises at least 30%, 40%, 50%, 60%, 70%, 80%, 90% w/w or more of intact plant protein relative to the total protein in the protein mixture.

The invention will be further illustrated by the following non-limiting Figures and Example.

BRIEF DESCRIPTION OF THE FIGURES

FIG. 1a. Shows mean of blood eAA over 4 hours per time point. FIG. 1b. Shows mean and 95% CI total sum blood eAA iAUC (nmol/mL) over 4-hours as described in Example 1. The area under the curve above baseline vs. time (min) was obtained by using the trapezoidal rule.

EXAMPLES

Objectives

Figure 2:
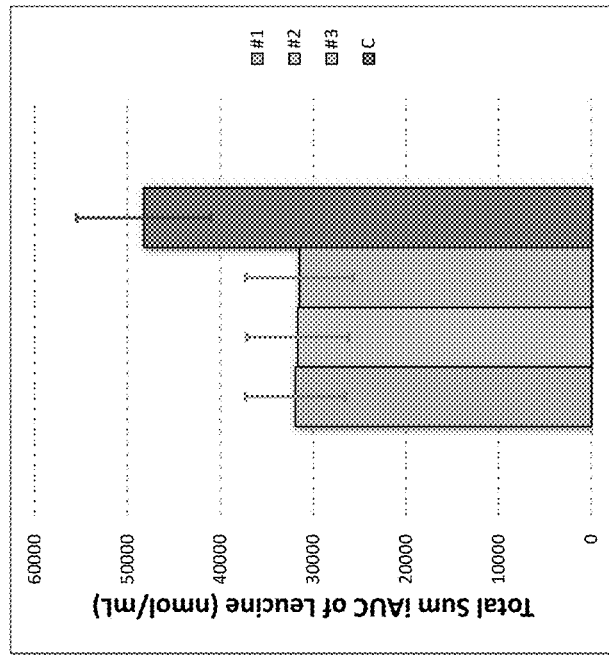
FIG. 2a. Shows mean of blood eAA over 4 hours per time point.
FIG. 2b. Shows mean and 95% CI total sum blood eAA iAUC (nmol/mL) over 4-hours as described in Example 1. The area under the curve above baseline vs. time (min) was obtained by using the trapezoidal rule.
Figure 2:
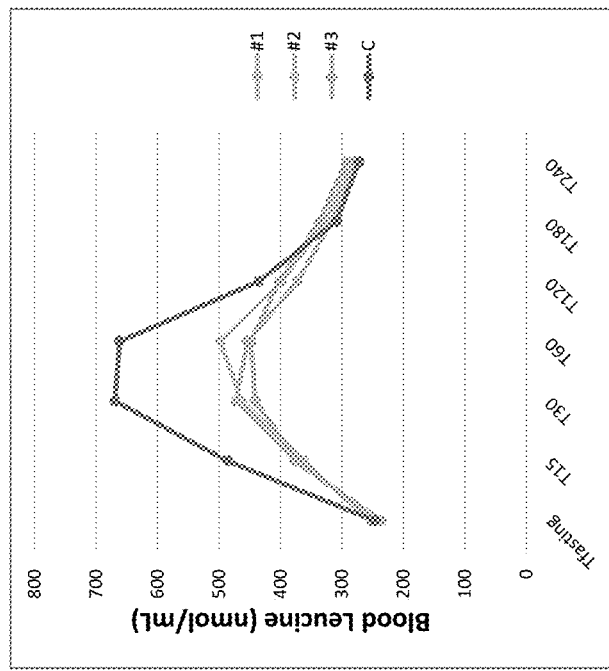

The inventors hypothesized that the complete plant-based protein blends of the invention, with a 1.0 PDCAAS, would be bioequivalent (defined in this study as similar blood eAA response) to WPI.

Methods

The primary objective of the study (ClinicalTrial.gov no. NCT03673839) was to assess the bio-equivalence of the total blood eAA response (iAUC) over 4 hours. The secondary objectives were to assess the bio-equivalence (iAUC) and leucine kinetics (Cmax and Tmax) over 4 hours.

Participants: The study was an acute, randomized, double-blind, cross-over, 4 periods×4 products William's square design study. Participants were healthy, adult men, 18-35 years of age, Body Mass Index (BMI) between 18.5 and 29.9 kg/m2. Participants were required to have self-reported resistance training experience of no less than 2 years, with resistance training of at least 1 hr/day for 2 days/week over the past 6 months.

Visits: Participants were instructed to abstain from any protein supplements for 1 day prior to the study intervention phase. Prior to each study visit, the participants were required to consume a standardized dinner, followed by at least a 12-hour overnight fast. Participants were randomized by sequence, on each study visit the participants consumed one of four study products: three plant-based protein blends (Tests) and a WPI (Control), mixed with water. One of the three plant-based blends was a hydrolysate treated with a protease enzyme.

The participants were given a study beverage and instructed to consume it over 10 minutes. Blood samples were collected before product consumption and 15 min, 30 min, 1 h, 2 h, 3 h and 4 h after the consumption of the study beverage. Blood amino acids were measured by ultraperformance liquid chromatography (UPLC).

Statistics: After a log-transformation of the total sum of blood eAA's iAUC over 4 hours, a repeated measures ANOVA model with fixed effect terms for sequence, product, period and participant within sequence as random was fitted to assess for bio-equivalence. Back transformed LS-Means differences and 90% CIs (i.e., ratio of Test to Control Geometric (GLS-Means) and associated 90% CI). For bio-equivalence to be demonstrated, the entirety of the 90% CI for the ratio of Test to Control GLS-Means must lie within the region (0.80 to 1.25).

Test Product

There were 4 study protein supplement test products, all of which were powdered drink mixes provided in single serving sachets to be mixed into 12 oz. of water. The study products consisted of animal (control) and plant-based proteins (3 test products) in a sweetened flavor system (cocoa powder, flavoring agents, *stevia*, xanthan gum). The control product was a commercially available Whey Protein Isolate. For the study, the product was purchased and repackaged into study product packaging.

All three plant-based blends included:
(i) Pea protein "Organic Puris pea 870H" (PurisPea, Minneapolis, MN; protein content: 80% weight); and
(ii) Pumpkin protein "Organic unroasted Pumpkin protein" (Austrade Inc., Palm Beach Gardens, FL; protein content: 60% weight).

Blend #3 was exactly the same as blend #1. However, blend #3 was a hydrolysate.

Blend #2 contained, in addition to the pea and pumpkin protein:

Sunflower protein "Helifor 55" (Austrade Inc., Palm Beach Gardens, FL; protein content: 55% weight); and Coconut protein "Organic Coconut Protein 17" (Austrade Inc., Palm Beach Gardens, FL; protein content: 17% weight).

Figure 3:
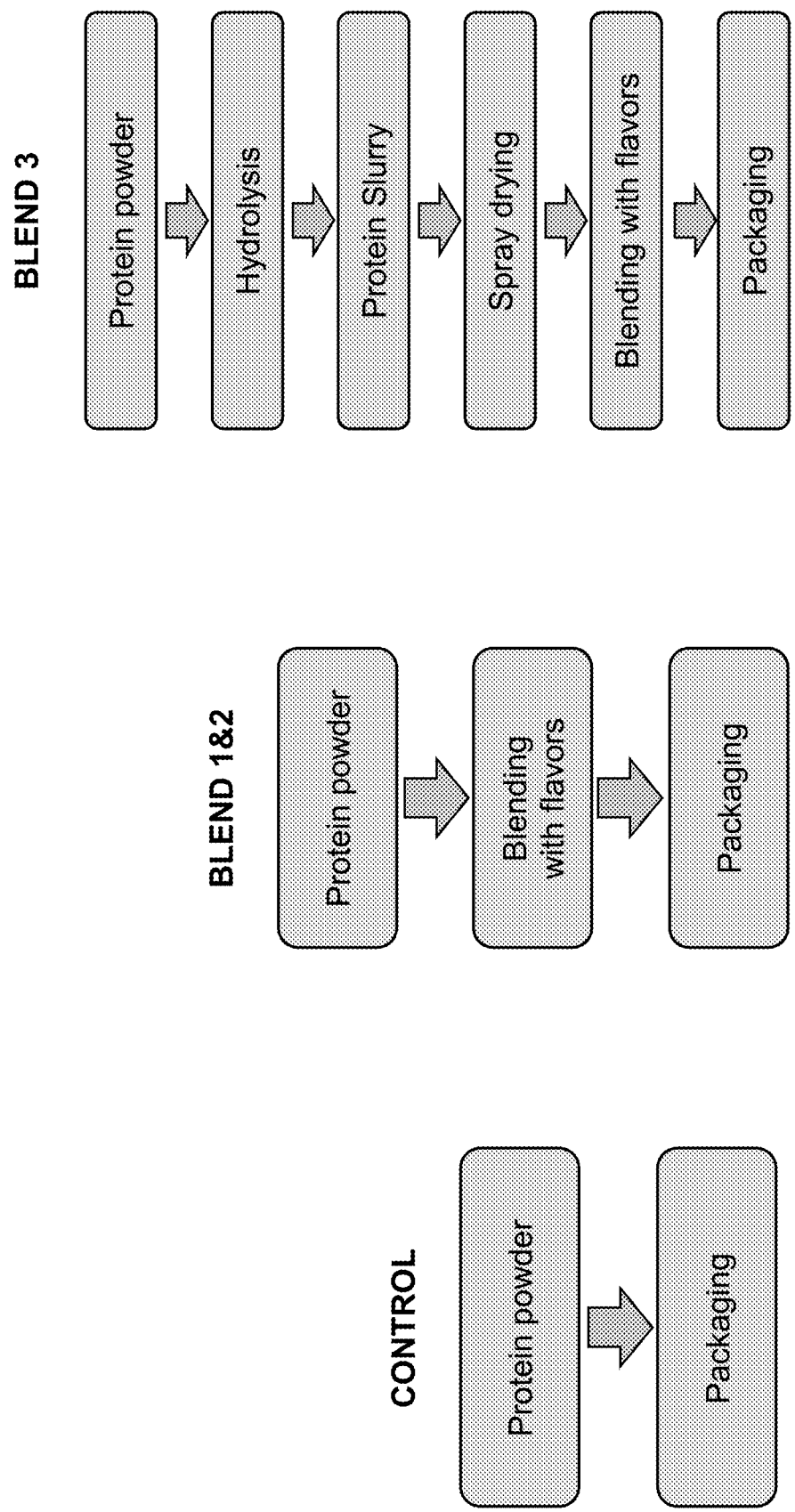
FIG. 3 provides an overview of the protein supplement preparation process as described in Example 1.

Further blend details are provided in Table 2, and an overview of the protein supplement preparation process is provided in FIG. 3.

All study products were served as a study beverage; 33-34 g of study product (protein mixture) was mixed with 12 oz (360 g) of bottle water of same brand in a shaker bottle. All study products were similar in appearance, packaging and nutritional content to maintain the double-blind nature of the study.

Study products were consumed within 10 minutes by participants.

In addition, after consumption of the study beverage, subjects were also given 50 ml of water to wash out the bottle and clean their mouth, ensuring that all product was consumed.

The storage of study products was at room temperature.

TABLE 2

|  | Whey Protein (+ control) | Blend 1 Pea 76% Pumpkin 24% | Blend 2 Pea 82% Pumpkin 4% Sunflower 11% Coconut 3% | Blend 3 Hydrolysate Pea 76% Pumpkin 24% |
|---|---|---|---|---|
| Total Protein | 24 g | 34 g | 33 g | 34 g |
| Leucine | 2.6 g | 2.6 g | 2.6 g | 2.6 g |
| Total BCAAs | 5.6 g | 5.6 g | 5.8 g | 5.6 g |
| Total eAAs | 13.2 g | 13.8 g | 13.9 g | 13.8 g |
| PDCAAS | 1.0 | 1.0 | 1.0 | 1.0 |

Blends 1&3

Pea "Organic Puris pea 870H" 76 g per 100 g protein powder mixture—60.8 g protein (76*0.8)

Pumpkin "Organic unroasted Pumpkin protein" 24 g per 100 g protein powder mixture—14.4 g protein (24*0.6).

Thus Blends 1 & 3 contained 81% w/w pulse protein relative to total protein content and 19% w/w non-pea plant protein relative to total protein content.

Blend 2

Pea "Organic Puris pea 870H" 82 g per 100 g protein powder mixture—65.6 g protein (82*0.8)

Pumpkin "Organic unroasted Pumpkin protein" 4 g per 100 g protein powder mixture—2.4 g protein (4*0.6).

Sunflower "Helifor 55" 11 g per 100 g protein powder mixture—5.5 g protein (11*0.5)

Coconut "Organic Coconut Protein 17" 3 g per 100 g protein powder mixture—0.51 g protein (3*0.17)

Thus Blend 2 contained 89% w/w pulse protein relative to total protein content and 13% w/w non-pea plant protein relative to total protein content.

Results

Eighteen men (Per Protocol set) aged 25.4±4.64 years (mean±sd) with a BMI of 24.4±3.35 kg/m$^2$ completed the study. For the primary outcome, the total sum of eAA iAUC over 4 hours of plant-based protein blends were not bio-equivalent to WPI, the three ratios [90% CI]: Blend #1: 0.66 [0.58-0.76]; Blend #2: 0.71 [0.62-0.82], Blend #3: 0.60 [0.52-0.69], indicative of a ~29 to 40% decrease of plant-based protein blends eAA iAUC over 4 hours compared to WPI. For the secondary outcomes, the sum total of leucine iAUC over 4 hours of plant-based protein blends were not bio-equivalent to WPI, the three ratios [90% CI]: Blend #1: 0.66 [0.59-0.73]; Blend #2: 0.67 [0.61-0.75]; Blend #3: 0.62 [0.56-0.69].

Leucine Cmax of plant-based protein blends were not bio-equivalent to WPI Blend #1: 0.70 [0.67-0.73]; Blend #2: 0.72 [0.68-0.75], Blend #3: 0.65 [0.62-0.68], indicative of a ~28 to 35% decrease over 4 hours compared to WPI. Leucine Tmax for Blend #1 and Blend #3 were close to WPI (Blend #1: 0.94 [0.73-1.18]; Blend #2: 1.56 [1.28-1.92]; Blend #3: 1.19 [0.95-1.48]).

TABLE 3

|  | Leucine Tmax over 4 hours (min) (SD) | Leucine Cmax over 4 hours (nmol/ml) (SD) |
|---|---|---|
| Blend 1 | 43.4 (16.5) | 460 (47)* |
| Blend 2 | 67.9 (29.7)* | 507 (63)* |
| Blend 3 | 53.7 (27.5) | 466 (48)* |
| Control (WPI) | 44.2 (15.4) | 716 (103) |

*p-value<.001, pairwise Student t test of the LS-Means difference Tests compared to control.

No adverse events related to the study product intake was observed.

CONCLUSIONS

This study represents the first human investigation in which blood eAA responses to complete, plant-based protein blends (PDCAAS=1.0), matched for leucine content were compared to whey protein. The results show that the three plant-based protein blends were not bio-equivalent to the WPI control, as measured by blood eAA data. However, the leucine kinetic data across the plant-based protein blends showed an approximate 2-fold increase from fasting levels.

Further, similar leucine Tmax data were observed across two plant-based protein blends (#1 and #3) compared to WPI. From a physiological standpoint, the leucine data provide evidence of a rapid hyperleucinemia and this is a critical response associated with postprandial stimulation MPS.

The invention claimed is:

1. A plant-based protein mixture comprising:
   a) 50.0%-95.0% w/w pulse protein; and
   b) 5.0%-50.0% w/w non-pea plant protein
based on total protein content and 60.0%-25.0% w/w essential amino acids based on total protein content, wherein the sum of said proteins equals 100% by weight.

2. The mixture according to claim 1, wherein said mixture comprises 50.0%-25.0% w/w essential amino acids based on total protein content.

3. The mixture according to claim 1, wherein said mixture comprises at least 5.0%-15.0% w/w, leucine based on total protein content.

4. The mixture according to claim 1 having a PDCAAS of 0.95 or higher.

5. The mixture according to claim 1 that is substantially free of cereal, gluten, soy and/or dairy matter.

6. The mixture according to claim 1, wherein the pulse protein is pea protein.

7. The mixture according to claim 1, wherein said proteins are substantially intact proteins.

8. A mixture according to claim 1 in a powdered, spray dried or granule form.

9. A method for protein supplementation of an individual comprising administering to the individual a composition according to claim 1.

10. The method according to claim 9, wherein said composition is ingested prior to during and/or subsequent to physical exercise.

11. A method for improving a result of physical exercise in a subject, comprising administering to the subject a composition according to claim 1.

12. The plant-based protein mixture of claim 1, wherein the mixture comprises:
   a) 70.0%-95.0% w/w pulse protein; and
   b) 5.0%-30.0% w/w non-pea plant protein
based on total protein content and 60.0%-25.0% w/w essential amino acids based on total protein content, wherein the sum of said proteins equals 100% by weight.

* * * * *